Figure 5:
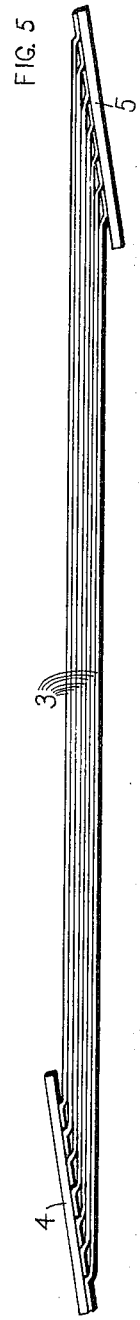

United States Patent [19]

Bergamini

[11] 4,421,203

[45] Dec. 20, 1983

[54] ROLL-OUT LAYERED EXPANSIBLE MEMBRANES (ROLEM)

[76] Inventor: John V. W. Bergamini, 520 N. Gilbert St., Iowa City, Iowa 52240

[21] Appl. No.: 411,264

[22] Filed: Aug. 25, 1982

[51] Int. Cl.³ .............................................. E04B 1/74
[52] U.S. Cl. .................... 181/284; 181/290; 181/294; 52/172
[58] Field of Search ............... 181/284–294, 181/175; 52/144, 145, 171, 172, 304, 787

[56] References Cited

U.S. PATENT DOCUMENTS 1,939,004 12/1933 Fischer ........................ 181/294 X
3,834,096 9/1974 Becker .............................. 52/172
4,166,345 9/1979 Becker .............................. 52/172

OTHER PUBLICATIONS

Foilplent Insulation, Inc., "Application Instructions for Type C-4R".

Primary Examiner—Benjamin R. Fuller

[57] ABSTRACT

Multiple membranes which are transparent, translucent, opaque or otherwise limit electromagnetic radiation are employed in an easily manufactured and transported roll which can be unrolled, cut to length, expanded, erected and sealed, thereby creating a thermally and acoustically insulating electromagnetic wave-limiting panel with separate dead air space separated by said multiple tensioned membranes.

10 Claims, 15 Drawing Figures

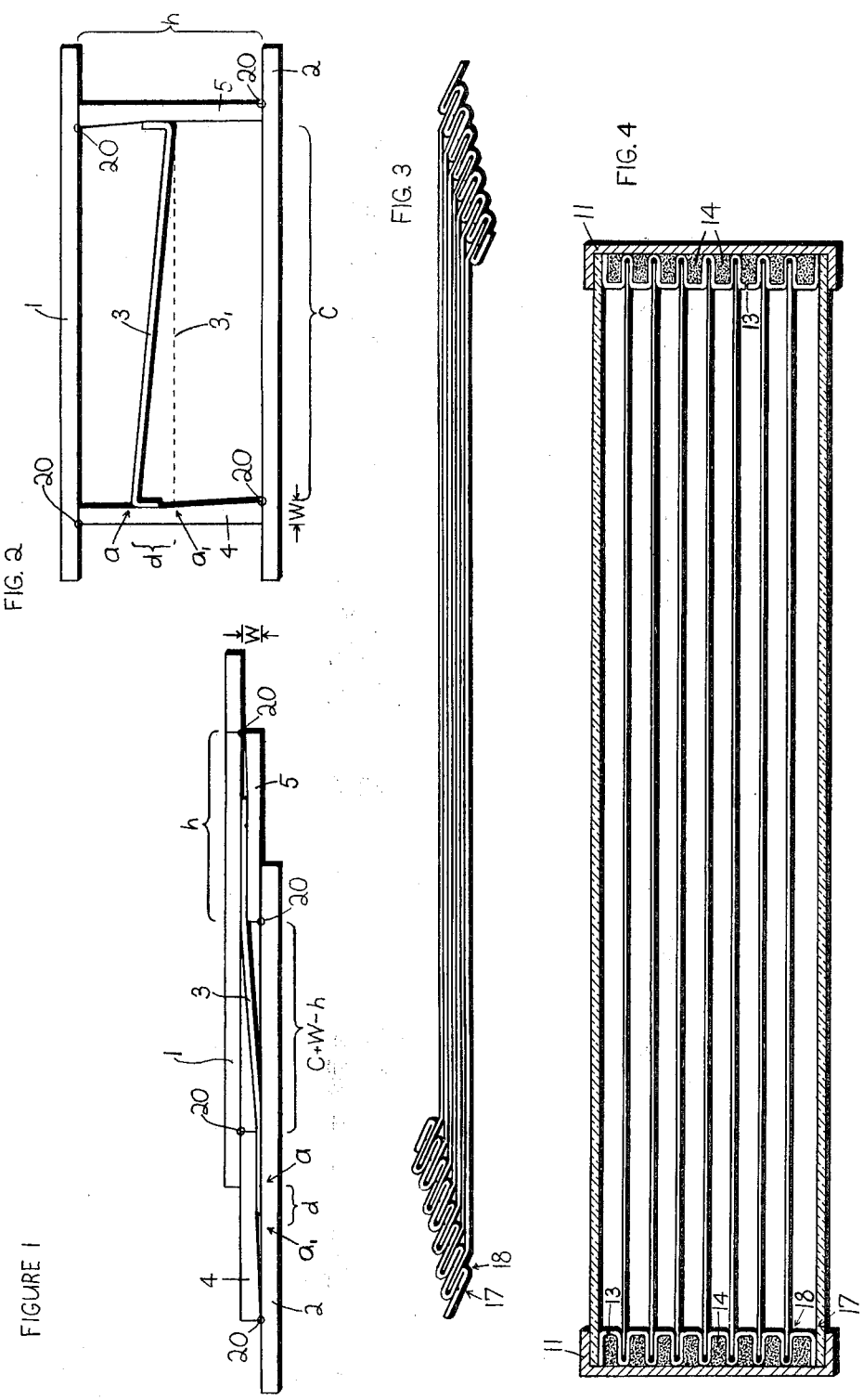

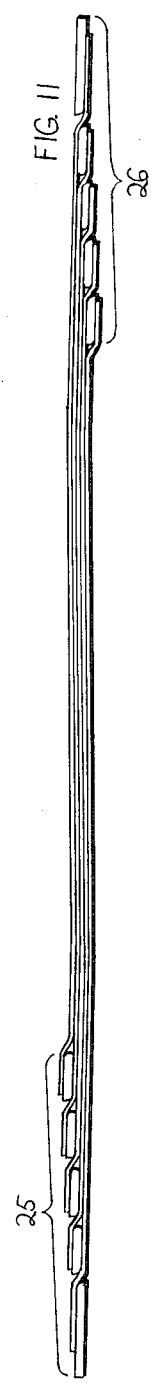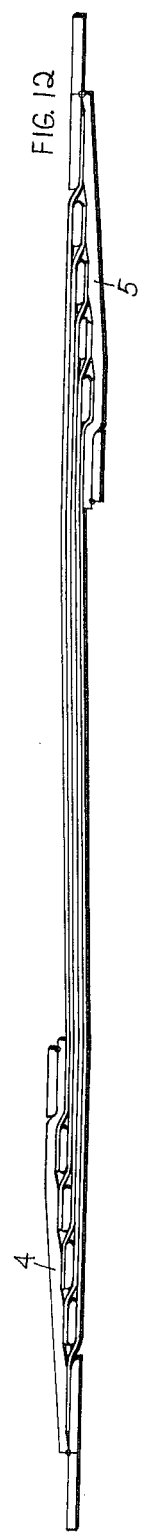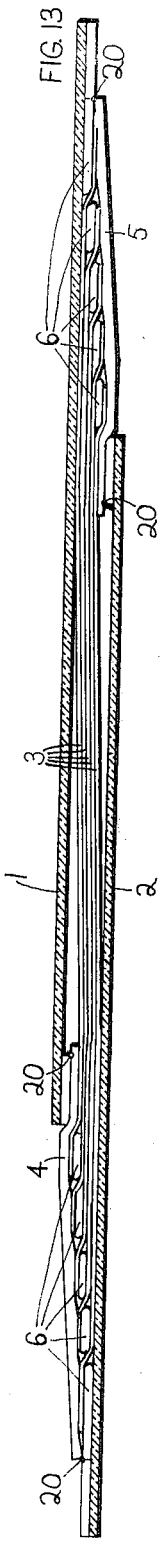

ROLL-OUT LAYERED EXPANSIBLE MEMBRANES (ROLEM)

FIELD

This invention relates to insulating building panels generally and more specifically to insulating building panels which are transparent, translucent, opaque or otherwise limit the transmission of electromagnetic radiation by using a multiplicity of dead air spaces and acoustic membranes to provide thermal and sound insulation.

BACKGROUND

Transparent or translucent architectural panels usually lose a large amount of the useful thermal and electromangetic energy in a dwelling. The opaque exteriors of buildings by comparison are usually far more insulating. Nonetheless, transparent or translucent panels are employed because they provide light and/or solar energy to a dwelling's interior or indirectly via solar collectors.

Translucent or transparent exterior surfaces which are inexpensive, good insulators would make energy self-sufficient architecture much easier. Glass and steel skyscrapers would have a cost-effective answer to the high fuel costs inherent in poorly insulating glazings. Solar greenhouses and various passive solar designs would no longer lose large amounts of heat at night or require night curtains. The efficiency of packaged solar collector units could be improved and the dangers of nighttime freeze-up minimized.

It is common knowledge that multiple glazings can be used to improve the insulating characteristics of translucent or transparent surfaces. Indeed an insulating panel can be made out of any sheets or membranes by layering the sheets or membranes so that they trap dead air spaces between them. The more dead air spaces, the greater the insulating value. A rule of thumb is that a 2 centimeter thick dead air space between two uninsulating air barriers yields an R-value of roughly 1. The air does the insulating, not the membranes, glazings or sheets.

Within these "dead" air spaces, convection currents are created which bring the air down the relatively cold air barrier and up the relatively hot air barrier. For this reason, beyond a certain point, little improvement in the insulating value is gained by increasing the distance between the air barriers; the convection current will render them all roughly equivalent. Thus, it is really the number of air barriers which is key to the heat insulating capabilities of a multiple air barrier or multiple membrane building panel.

Heretofore, the cost of manufacturing multiple glazed transparent or translucent panels has virtually prohibited using more then two or three glazings. Similarly, opaque insulation using multiple parallel dead air spaces has never been cost-effective.

Membranes can be made to absorb specific sound frequencies by tensioning them to oscillate and dampen specific sound waves. By tensioning many different membranes to absorb different sound frequencies, and combining these membranes into one building panel, a building panel which insulates over a whole spectrum of sound will result. Heretofore, sound insulation comprised of multiple, frequency-specific membranes, has been relatively complex in design and costly to manufacture.

In summary, the use of multiple membranes with interposed dead air spaces can be used both as a technique for thermal insulation and sound insulation. Heretofore, because of the costs of manufacturing panels with multiple parallel air spaces, different means of thermal insulation are usually used. The exceptions to this are transparent or translucent panels where two or three parallel surfaces are frequently employed for improved insulation. If it were not prohibitively expensive, more parallel surfaces would be used so that these transparent or translucent surfaces would insulate better. Similarly, multiple sound-specific tensioned paralled membranes have long offered the capability of serving as sound insulation, but manufacturing costs have been prohibitive.

OBJECTS

It is an object of this disclosure to reveal a device which can be inexpensively manufactured, transported, subsequently expanded, and used as a panel with multiple, roughly parallel membranes (with multiple parallel dead air spaces between the membranes). A further object of this disclosure is to reveal how the device may be so configured that when it is expanded or erected, the roughly parallel membranes will be tensioned in a predictable way.

DRAWINGS

FIGS. 1 and 2 are analytic drawings which scrutinize the device's principle of expansion or erection and the means of tensioning flexible membranes.

FIGS. 3 and 4 depict respectively, the flattened and erect cross sections of a particular embodiment of the invention. In this embodiment, none of the membranes are required to bend in the erect position of the device because the sidewalls themselves hinge where they are attached to the membranes. FIG. 4 not only shows the erect position of the device but also two panes of glass on the extreme sides of the device which attach to two structural enclosures which fit over the sidewalls and form separate desiccant boxes for each dead air space created by the multiple membranes.

Figure 6:
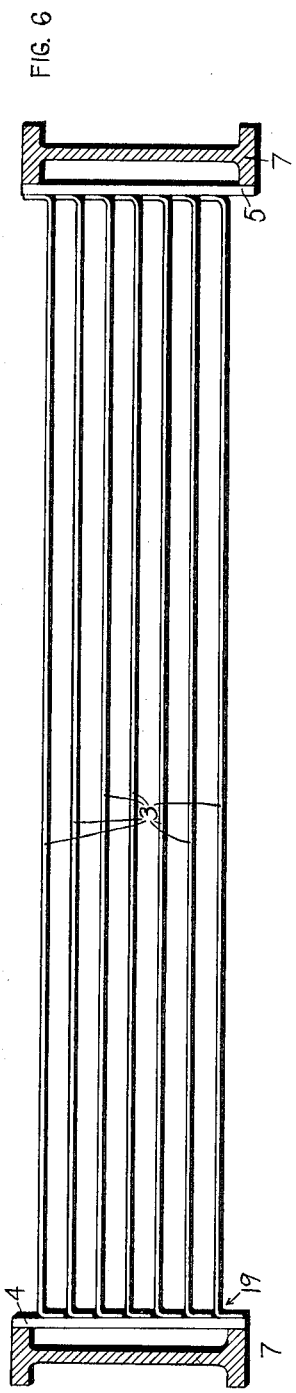

FIG. 5 shows a ROLEM in its flattened, rolled-up position with self-hinging membranes (3) attached to the sidewalls (4,5). Tougher membranes could be attached to the extreme sides once the ROLEM has been installed, or perhaps no additional membranes need to be added because the application involves tolerably small mechanical stresses. FIG. 6 shows an expanded or erect cross section of the ROLEM embodiment in FIG. 5 installed between two I-beams (7).

Figure 7:
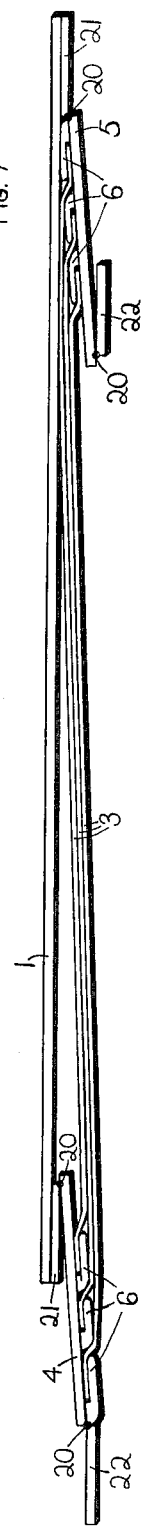
Figure 8:
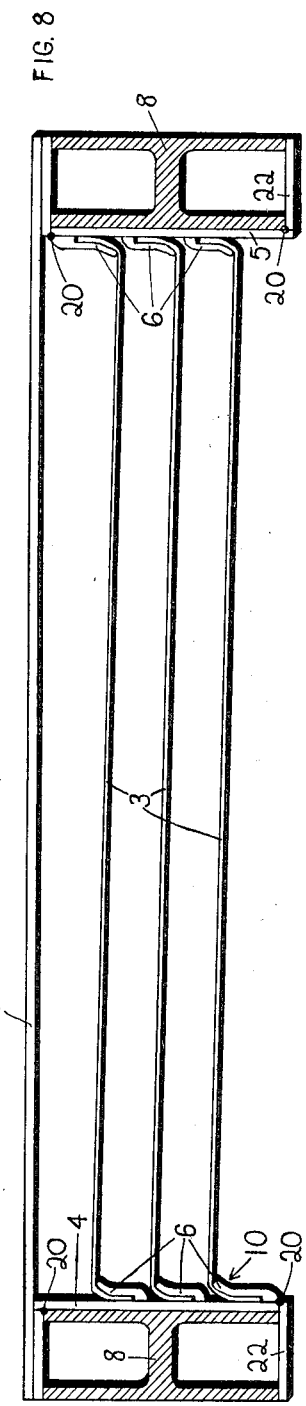

In some situations, it may be desirable to have a ROLEM with one tough, durable extreme membrane without other mechanically tough membranes. Applications using such a species of the device might be a solar collector with a tough membrane on the exterior and delicate though inert membranes near the energy absorbing surface. Another application might be using a ROLEM to insulate a hot light source in a cold room where the tough membrane would protect the delicate membranes and the light source. In both these applications, only one of the extreme membrane surfaces need be mechanically tough. Embodiments of a species of the device for these and other applications are shown in FIGS. 7 and 8. In FIG. 7, a flattened cross section of an embodiment with a relatively rigid membrane (1) attached to a pair of hinged sidewall portions (21), an additional pair of hinged sidewall portions (22), and multiple self-hinging membranes (3) attached with spring moldings (6) to the sidewalls (4,5). FIG. 8 shows the expanded or erect position of the device in FIG. 7.

Figure 9:
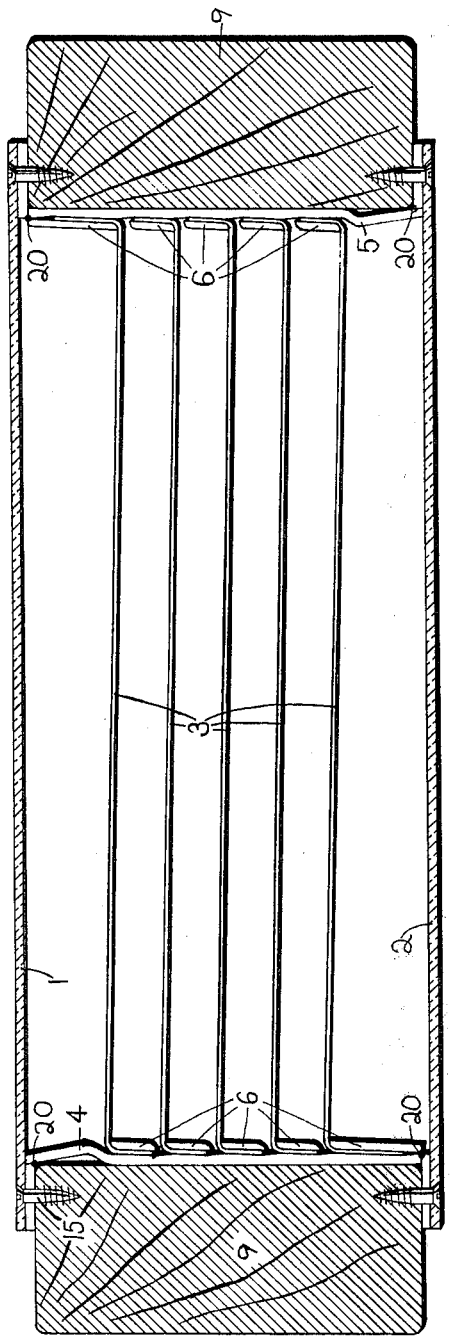

Some applications require a ROLEM with mechanically resistant membranes on both extreme sides which are integral with the ROLEM roll so that the device may be installed quickly and completely. FIGS. 9 and 13 depict an embodiment of ROLEM for this purpose. FIG. 13 depicts a flattened cross section of the device. FIG. 9 shows the device in the expanded or erect position installed between wood studs (9).

Figure 15:
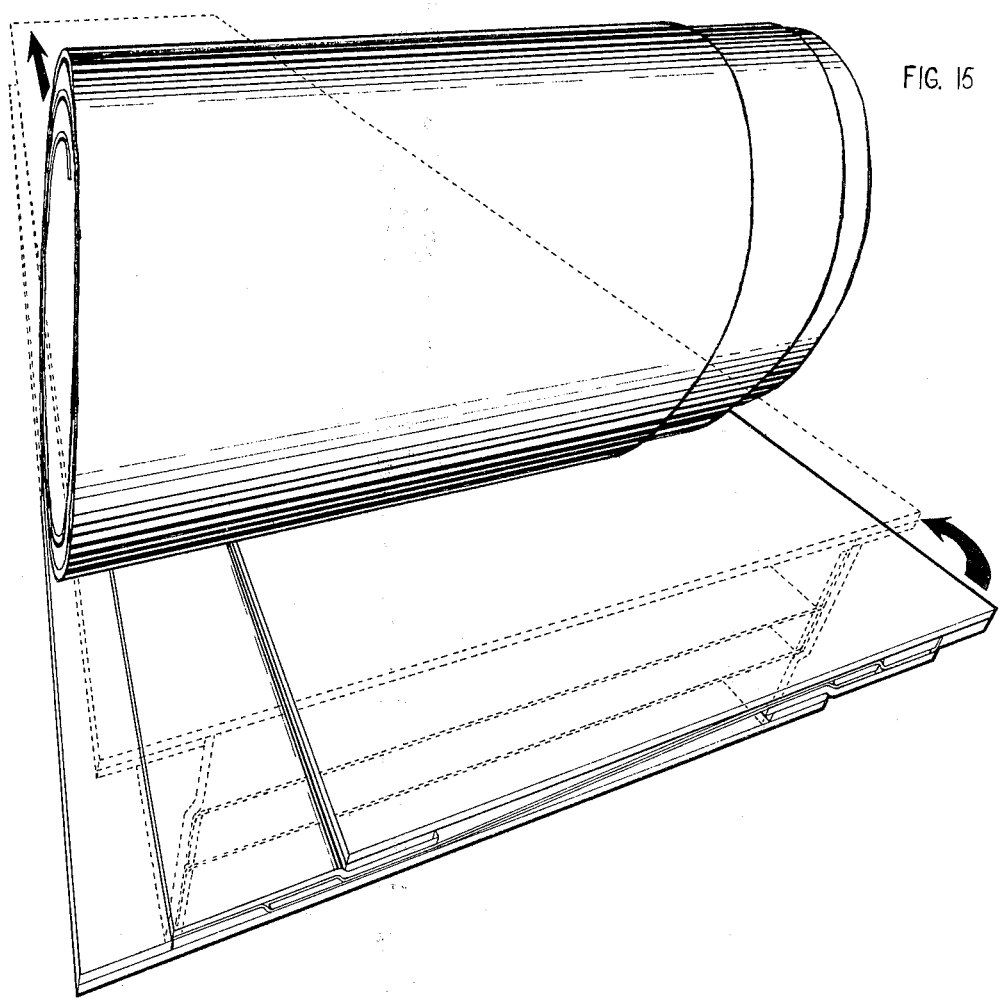

FIGS. 10 through 13 show the cross section of a ROLEM at various stages in the assembly process. FIG. 15 is a perspective drawing of a partially unrolled ROLEM roll with integral, relatively rigid, extreme membranes attached to hinged sidewall portions, superimposed on the same embodiment unrolled, expanded and erected.

In all the drawings, many of the details have been exaggerated or disproportioned to clarify the description of the invention.

THE INVENTION

As the various drawings of different embodiments of the invention suggest, there are many different applications for, and many different ways to make ROLEMs. Indeed the drawings only begin to cover the various imaginable useful modifications of the invention. Amongst this diversity, however, are very few components which together make the invention. These components are summarized as follows:

1. Membranes (clear, translucent, opaque, or otherwise electromagnetic-wave-limiting).
   (a) Relatively rigid membranes
   (b) Relatively flexible membranes
2. The erectable or expansible, roughly parallelogrammic cross section.
3. The means of purposely tensioning membranes by adjusting their lines of attachment to the sidewalls and, thereby, the amount they must flex in the erect, installed position of the device.
4. The means for securely attaching the sidewalls to a structural frame.
5. The means of hinging the device's membranes to the sidewalls.
   (a) Self-hinging membranes
   (b) Hinging means integral to the sidewalls
6. The means of attaching the membranes to the sidewalls.
7. The means of assembling the invention and rolling it into a roll.

The purpose of this invention is to create a novel means of making insulating panels using multiple parallel dead air spaces. These dead air spaces are separated by membranes. All of the membranes used for this device must be flexible enough so that they may be rolled-up. Within these mechanical constraints there are many possibilities. A useful subdivision of these possibilities is to consider relatively flexible membranes and relatively rigid membranes. Relatively rigid membranes (although still adequately flexible to be rolled up) might be acrylic impregnated fiberglass sheet, steel or aluminum sheeting, wood veneer, acrylic plastic sheet etc. By comparison, relatively flexible membranes might be "mylar", "teflon", or "tedlar" films, cellophane, aluminim foil, vinyl, cloth, paper etc. In a particular embodiment of the invention with different membranes of different mechanical characteristics, the most rigid type of membrane will, of course, be the relatively rigid membrane and the other membranes will be the relatively flexible membranes.

FIG. 1 is a cross-sectional diagram of a particular embodiment of the device. Three membranes (1, 2, and 3) are attached to sidewalls (4,5). The device is subsequently rolled-up (see FIG. 15 as an example.), transported to a manufacturing or building site, unrolled and erected or expanded by turning the sidewalls approximately 90 degrees with respect to the membranes, and allowing air into the cavities between the membranes (See FIG. 2). The sidewalls together with the membranes form in cross section a parallelogram which is flattened in the rolled-up position and roughly rectangular in the erect or expanded position.

FIGS. 1 and 2 show an embodiment of a ROLEM in respectively the flattened and expanded or erect positions. This embodiment has three membranes; the two extreme membranes (1 and 2) are intended to be relatively rigid and the middle membrane (3) is intended to be relatively flexible. The relatively rigid membranes and the sidewalls essentially determine the cross sectional dimensions of the device in both the flattened and erect positions. The relatively flexible membrane must conform by stretching to the cross sectional dimensions set by the relatively rigid membranes and the sidewalls.

One of the purposes of FIGS. 1 and 2 is to illustrate how relatively flexible membranes may be attached to the device's sidewalls (4,5) so that when the device is expanded or erected, these relatively flexible membranes will: (1) deviate slightly from true parallel relationship to the relatively rigid membranes, (2) compensate for a sagging which would occur if the membranes did not deviate from said parallel relationship and which is a geometric result of both the device's principle of erection and (in some embodiments of the device) the finite thickness of the sidewalls, and (3) flex to a predictable tension depending on the amount of deviation from the true parallel position and the tensile properties of the membrane.

If all the elements in the device were negligibly thick and one did not care to tense the membranes in different ways, it would be a simple matter to build a ROLEM. The components would behave in cross section like a parallelogram. The parallelogram could flatten out to a single line segment and expand or erect into a rectangle. In actuality, however, things have thicknesses and elastic properties. What this means in terms of ROLEM embodiments with relatively thick sidewalls, is that the hinges (20 in FIGS. 1 and 2) attached to the relatively rigid, extreme membranes must be on one side of the sidewall's thickness to allow the device to erect correctly. Look at the hinge locations (20 in FIGS. 1 and 2). In the erect position (FIG. 2), the span of the middle membrane (3) when it is parallel to the hinged membranes equals c. In the collapsed position, the span of the membrane equals: $h+(w^2+(c+w-h)^2)^{\frac{1}{2}}$ where $h=$ the width of the sidewall and $w=$ the thickness of the sidewall as shown in FIGS. 1 and 2.

The quantity $(w^2+(c+w-h)^2)^{\frac{1}{2}}$ is the flexible membrane's diagonal span length between the edges of the sidewalls in the collapsed position. The distance h is the total span length of the membranes sandwiched between the sidewalls and the relatively rigid membranes. This calculation is done assuming the flexible membrane is attached to the sidewalls so that it will be parallel to the relatively rigid membranes when the device is erected. Algebraic manipulation yields the result:

$$h+(w^2+(c+w-h)^2)^{\frac{1}{2}}=h+(2w(w+c-h)+(c-h)^2)^{\frac{1}{2}} \qquad (1).$$

In general, c does not equal $h+(2w(w+c-h)+(c-h)^2)^{\frac{1}{2}}$. It is easy to show that $c<h+(2w(w+c-h)+(c-h)^2)^{\frac{1}{2}}$ (2).

(Proof: Generally, the membranes are wider then the sidewalls. This means $c>h$. C, h, w are all positive values. So $c=h+(c-h)=h+((c-h)^2)^{\frac{1}{2}}$. Since c, h, w and $(c-h)$ are positive, it follows that $2w(w+(c-h))$ is positive. This means that $((c-h)^2+2w(w+c-h))^{\frac{1}{2}}>((c-h)^2)^{\frac{1}{2}}$. Therefore $h+((c-h)^2)^{\frac{1}{2}}=c<h+((c-h)^2+2w(w+c-h))^{\frac{1}{2}}$.)

Inequality (2) basically says that the flexible membranes will be somewhat slack in the device's erect position if it was untensed in the device's flattened position.

To avoid this slack, the flexible middle membrane (3) may be attached to the sidewalls such that in the erect position of the device, this flexible membrane will not be perfectly parallel to the relatively rigid extreme membranes. This nonparallelism serves to eliminate slack first by creating a somewhat longer span for the flexible membrane in the erect position of the device, (the membrane does not take the shortest possible path between the sidewalls but rather takes a slightly diagonal path); and second by shortening the distance between the two attachments of the flexible membrane to the sidewalls in the flattened position. In FIGS. 1 and 2, the flexible membrane's ($3_1$) line of attachment to the sidewall (4) is designated by "$a_1$" when it is attached so that it will be parallel to the extreme membranes 1 and 2. "a" designates a line of attachment which will make the flexible membranes (3) slightly nonparallel to the extreme membranes (this is shown clearly in FIG. 2), and shorten the distance between the lines of attachment of the flexible membrane in the collapsed position (FIG. 1).

In FIG. 2, the solid line depicts the slightly nonparallel flexible membrane (3). One edge of the flexible membrane has been moved up a distance "d" so that said membrane's span length in the erect position of the device is $(d^2+c^2)^{\frac{1}{2}}$. This length must equal or surpass said membrane's span in the collapsed position of the device minus this distance "d": $(d^2+c^2)^{\frac{1}{2}}$ is greater than or equal to $(w^2+(c+w-h)^2)^{\frac{1}{2}}+h-d$. To get a lower limit on the value of d, let $(h+(w^2+(c+w-h)^2)^{\frac{1}{2}})=A$ and set $(d^2+c^2)^{\frac{1}{2}}=A-d$. This implies $d^2+c^2=A^2-2Ad+d^2$. This implies $2Ad=A^2-c^2$. Therefore $d=(A^2-c^2)/(2A)$.

If d—that is, the deviation from exact parallelism with respect to the rigid membranes—is made somewhat larger than this value, the flexible membrane will have to flex somewhat when the device is erected. The amount of flexure can be adjusted by adjusting the value of d. In practice, d will be very small relative to c or h and the nonparallelism of the flexible membranes will be almost undetectable. For descriptive purposes, the flexible membranes are roughly parallel although strictly speaking, they will rarely be exactly parallel to the relatively rigid membranes, and sometimes, not even exactly parallel to other flexible membranes in embodiments of the device with multiple flexible, differently tensioned membranes.

FIGS. 5 and 6 are respectively the collapsed or flattened positions and the erect or expanded positions of a ROLEM with only self-hinging membranes. Because all the membranes are self-hinging, the whole device will be quite pliant even when it is expanded or erected. The sidewalls of such an embodiment would have to be attached to rigid structural members for the device to have dimensional stability as well as to tense the membranes. Variations in the amount of flexure, and hence the tension on these membranes, will depend, as previously noted, on how much tension is applied between the sidewalls by attaching them to rigid structural members and/or by the deviation from true parallelism amongst the membranes themselves.

The embodiment in FIGS. 5 and 6 could be made of transparent, translucent or opaque plastic. Paper or a plastic-paper composite are also viable materials useful for different applications. For example, if an inexpensive biodegradable insulating panel were sought, paper would be ideal. If the panel membranes were made of clear teflon film, then it could be used to create a virtually inert insulating window.

All embodiments of the device once they have been expanded or erected are intended to be attached to structural members of a larger unit. These structural members could be the wood studs of a frame house (as in FIG. 9), metal framing members that double as housings for a desiccant material (11 in FIG. 4), I-beams (as in FIG. 6), "H" beams (as in FIG. 8), a solar collector frame, or other structural framing means. Generally the panel's sidewalls rather than the membranes will attach to the structural members. For example, the embodiment in FIG. 6 uses the borders of the sidewalls (4,5) as flanges which are fastened to the I-beams (7). The membranes, however, can also be attached to structural elements. FIG. 9, for example, shows a ROLEM attached to wood studs with fasteners (15) which extend through the outer membrane and through a hinged portion of the sidewall (which is laminated to the outer membrane) and into the wood. Special hinged flanges can also be used to attach the sidewalls. In FIG. 8 hinged flanges (22) are attached to the H-beams (8). These special hinged flanges could double as surfaces to attach additional membranes, glass, or panels. In general, the sidewalls may be modified to accomodate additional components of the structure to which a ROLEM is attached.

All membranes must be attached to the sidewalls with some hinging means so the device may be erected or expanded. One way this may be accomplished is shown in FIGS. 5 and 6. In FIG. 6, the membranes are so flexible that they can bend abruptly (19) where they are attached to the sidewalls. Such self-hinging membranes would have to be made of very pliant materials such as paper or a plastic film. By attaching the membrane's borders flat onto the sidewalls as shown in FIG. 5, the membranes can hinge and are attached in a relatively effortless manner. Because of this ease of fabrication, this means of hinging the sidewalls would be most common and is, in fact, used on all embodiments shown in the drawings except in FIGS. 3, 4, and 14.

Another way membranes can be hinged to the sidewalls is by incorporating some kind of hinging mechanism into the sidewalls to which the membranes are attached. FIGS. 3 and 4 illustrate a ROLEM embodiment with membranes attached to hinging means integral to the sidewalls. The typical portions of the sidewalls designated by 17 and 18 bend and the membrane cross sections could remain virtually straight and unbent in both the flattened and erect positions of the device. The membrane (1) in FIGS. 7 and 8 and two membranes (1 and 2) in FIGS. 9 and 13 remain straight and unbent in both the flattened and erect positions of the device because the membrane's borders are attached to hinged sections of the sidewalls via hinges (20). The advantage of these hinging means integral to the sidewall rather than self-hinging membranes is that the membranes can be comparatively rigid and mechanically resistant.

Depending on the materials used in a ROLEM and the mechanical requirements of a particular application the means of attaching the membranes to the sidewalls may vary. Relatively rigid membranes, attached to hinged sidewall sections (for example, membrane 1 in FIGS. 7 and 8, or membranes 1 and 2 in FIGS. 9 and 13) could be glued, heat-sealed, riveted, stapled, sewed or clamped. The use of modern adhesives may prove to be the most cost-effective for most applications for these insulating panels.

Similarly, the self-hinging membranes (3 in FIGS. 5, 6, 7, 8, 9, and 13) may be glued, heat sealed, riveted, stapled, sewed, clamped or otherwise stuck or fastened as is required for a particular application. The additional application of moldings (6 in FIGS. 7, 8, 9, and 13) at the borders may help to fasten these relatively delicate membranes in place. A typical molding would be flat (so the device can be flattened and rolled up) and parallel to a sidewall with a self-hinging membrane border between it and the sidewall. If the molding is made of a relatively rigid material such as sheet metal or acrylic impregnated fiberglass and then glued, heat sealed, riveted, stapled, sewed, clamped or otherwise stuck or fastened to the sidewall, the delicate flexible membranes may be clamped onto the sidewall more securely than they could be otherwise. These moldings can also be used to help tense the membranes. FIG. 8 shows how self-hinging membranes (3) are attached and supported by relatively rigid moldings (6) which flex slightly (10) in the erect position of the device and thereby help tense the membranes. By considering the mechanical properties of the membranes and moldings, and the geometry of the ROLEM, the amount of tension on the membrane in the erect position of the device is predictable.

A constraint affecting all membranes in any ROLEM embodiment is that the membranes must be flexible enough so the whole device can be rolled up in its flattened position. Membranes attached to hinging means integral to the sidewalls are, as previously noted, usually flat in cross section and when the device is rolled up, the membranes are required to bend in only one direction. The self-hinging membranes, by comparison, are usually somewhat crooked in cross-section, even in the flat position of the device (3, FIGS. 1, 5, 7, 13) and thus, these membranes are required to bend slightly in two directions when the ROLEM is rolled up. This bi-directional curvature, however, will be tolerated by the slightly elastic membranes without tearing or deforming in the rolled-up position.

The extreme membranes of a ROLEM are the only ones which may have to have tough mechanical properties to protect the panel from environmental stresses. Sometimes, even these extreme membranes can be quite delicate if the environment is adequately gentle or if the ROLEM is to have additional protective glazings, panels or membranes added as in FIG. 4. All the membranes, however, need be somewhat flexible and able to support their weight once the ROLEM has been expanded and installed. An extremely stable fluorocarbon such as fluorinated ethylpropylene (trade name "Teflon") would be ideal for use as the delicate membranes of an insulating glazing panel. All ROLEM insulating panels will use membranes which are as thin as possible to minimize cost particularly if they are made of expensive materials such as fluorocarbons. These membranes will be as thin as possible and still able to withstand the very small manufacturing and installation stresses. This could mean films one half mil or less in thickness in the case of teflon and other plastics. In this way, the cost of manufacturing highly insulating ROLEMs with many inner membranes can be greatly reduced.

Though the principle of expansion or erection of a typical ROLEM is quite simple, it may be delicate in practice owing to the delicacy of many of the membranes. Air enters between the membranes only through the cut-off ends of the ROLEM. By laying a cut length of unrolled ROLEM on a flat surface and slowly deforming one end from its flat towards its rectangular cross-sectional shape, the air will flow into the ROLEM at the cut ends between the membranes and the entire ROLEM will soon be expanded. The rate at which the ROLEM will deform into its rectangular shape is dependent on how fast the air flows into the cavities between the membranes at the two ends. If this process is done too quickly, the inner membranes may tear.

The major advantage ROLEMs have over other multiple glazing designs is the simplicity and ease with which the ROLEMs can be manufactured and shipped. Most ROLEM embodiments can be manufactured without bending or forming the sidewalls or membranes. All that is required are membrane rolls, sidewall material rolls (and optionally, molding rolls). These rolls are stuck or fastened together with adhesives, fasteners, thread or some other attaching means. The attached membranes and sidewall materials are then rolled up themselves, thereby simultaneously pressing the glued or otherwise attached components together and packaging the completed ROLEM in an easily transportable roll. The manufacture of a ROLEM is so simple and easily automated that the real production costs will be a fraction of the cost of materials. Furthermore, because there need be virtually no mechanical stresses applied to the membranes in the manufacturing process, most membranes can be extremely thin and materially efficient.

The ROLEM embodiment of FIGS. 9 and 13 is one of the more complex ROLEMS to manufacture because it is a relatively complex ROLEM design. Nonetheless, as the following description of a means to manufacture the ROLEM embodiment of FIGS. 9 and 13 will demonstrate, it is an easy and simple process.

Figure 14:
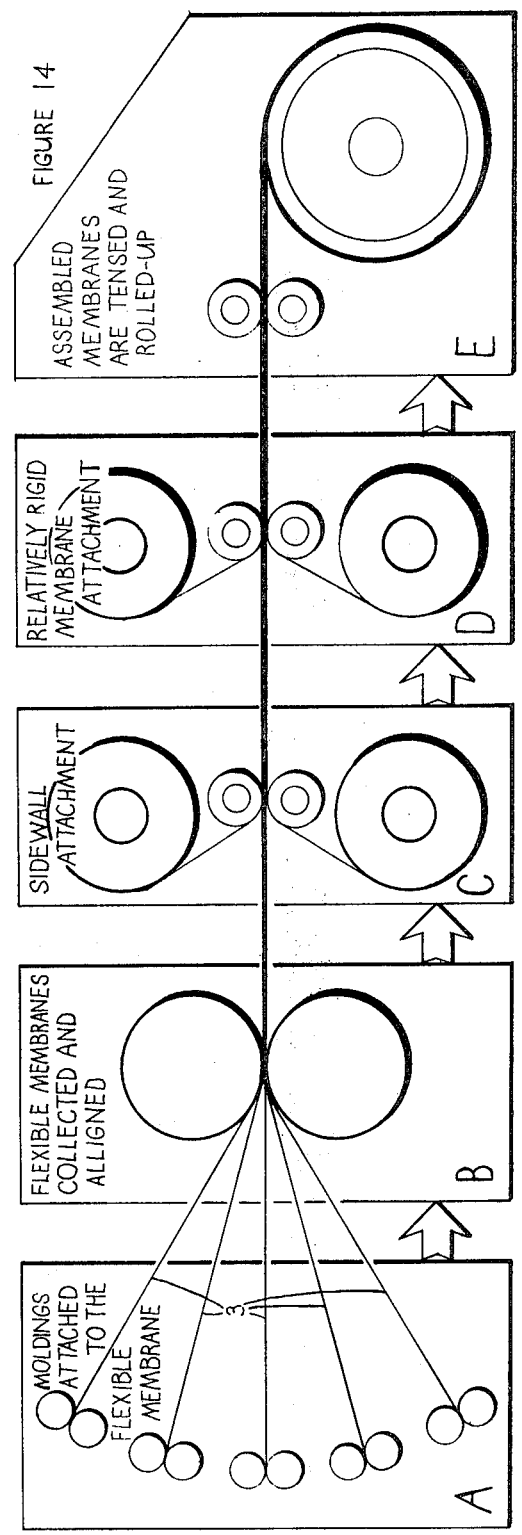

FIG. 14 depicts a schematic drawing of a representative ROLEM assembly line. The assembly line is subdivided into six different sections "A" through "E". Each section represents a step in the assembly of the ROLEM embodiment depicted in FIGS. 9 and 13.

In section A, the middle membranes (3 in FIG. 10) are unrolled while molding strips are attached to both edges. These molding strips (6 in FIG. 10 could be any number of different materials. They could be clear, colored or reflective adhesive tape; they could be semiflexible impregnated fiberglass or any other suitable substance. The purpose of these moldings is to give the middle membranes more support at their edges where they adhere to the sidewalls (4,5) and to help tense the self-hinging membranes. The moldings must be more rigid than the self-hinging membranes to achieve these purposes. Each self-hinging membrane gets two moldings: one on one edge and another on the opposite edge. See FIG. 10. Schematic drawings of mechanisms to accomplish this are shown in section A of FIG. 14. Each of these mechanisms would involve some means of unrolling a self-hinging membrane and two rolls of molding, and then attaching the moldings on the membranes correctly. In FIG. 14 there are five separate mechanisms that attach moldings to each separate self-hinging membrane.

In section B a schematic drawing of a mechanism which would align the self-hinging membranes so their cross sections look like FIG. 12 is shown. All of the self-hinging membranes are layered together so that their molding edges nearly butt on each other. The membranes lie on one another so that much of the molding surface is covered by the membranes.

In section C of the ROLEM assembly line, the sidewalls (4,5) are connected to the self-hinging membranes. A schematic drawing of a mechanism to perform this function is drawn in section C of FIG. 14. FIG. 12 depicts a cross section of the ROLEM once it has passed through section C of the assembly line. The self-hinging membranes and the sidewalls are attached by some means. An adhesive could be applied to the surfaces (25 and 26) in FIG. 11 or to the sidewall surfaces, or to both. The need for the alignment mechanism in section B is demonstrated here, for if the self-hinging membranes are not properly aligned, they will not be stuck to the sidewalls correctly. In general, the correct alignment of all of the elements involved in the manufacture of a ROLEM is essential.

It is in this step, section C of the ROLEM assembly line, where the value of the self-hinging membrane asymmetry can be seen. If there were perfect symmetry of the moldings in the expanded position of a ROLEM, the edges of the self-hinging membranes on one side of the cross section in FIG. 11 would have to be folded over the moldings. The result would be creased membranes on one side of the ROLEM. Thus, the asymmetric moldings are essential for simple and effective manufacture. The result, which can be seen in FIG. 9, is that the self-hinging membrane moldings on the left side of the ROLEM are all positioned about one molding width above the moldings on the right side. All of the ROLEM embodiments in the drawings with self-hinging membranes have this asymmetrical feature (see FIGS. 2, 6, 8, and 9. Notice that the self-hinging membranes bend roughly 90° in one direction on one sidewall and bend roughly 90° in the other directionon the other sidewall.

The sidewalls (4,5) of this particular embodiment of the invention might be made of some semi-rigid substance like resin impregnated fiberglass or some plastic. Whatever the substance is, it must be flexible enough to bend in one direction so the ROLEM can roll up. In ROLEM designs without semi-rigid extreme membranes like those depicted in FIGS. 5 and 6, the sidewalls (4,5) might supply be semi-rigid slabs with no provisions for the subsequent attachment of extreme membranes. In applications where there are virtually no mechanical stresses on the self-hinging membranes, the cross section of a completed and expanded ROLEM might look like FIG. 6. If tougher extreme membranes are required, they would have to be attached to the structural members the ROLEM is attached to, since this particular ROLEM has no provisions for extreme membranes. This ROLEM embodiment would not require Section D of FIG. 14 in the represented ROLEM assembly line.

Alternatively, hinged semi-flexible sections (21, 22 in FIGS. 7 and 8) might be added to portions of the sidewalls. These hinges might be made of fiberglass cloth impregnated with resin and stuck to the semi-rigid sections of the sidewall everywhere along their length except where they are required to hinge. Alternatively, the hinge might be some highly pliant plastic or bendable sheet metal. In any case, the hinge should preferably be airtight so that water vapor cannot get between the membranes. These hinged sections would bend 90° to the portions of the sidewalls where the self-hinging membranes are attached when the ROLEM is expanded. These hinged sections could be used as flanges to attach the sidewalls to the structural membranes and/or to provide platforms for attaching a membrane once the ROLEM has been installed. The membrane (1) on the top portion of the ROLEM is hinged to the sidewalls with this type of hinge. Glass, an opaque membrane, or some other panel could be attached to the free pair of hinges on the "bottom" side of the ROLEM.

As previously noted, membrane attached to hinging means integral to the sidewalls (FIGS. 3, 4, 7, 8, 9 and 13) can be relatively rigid because they are not required to bend abruptly. Relatively rigid or flexible membranes may be attached to the hinged section of the sidewalls (of the ROLEM embodiment schematically manufactured in FIG. 14) with glue sealant or some other appropriate means of attachment. Section D of FIG. 14 shows a schematic drawing of a mechanism for attaching the membranes to the hinged portions of the sidewalls. FIG. 13 shows the cross section of a ROLEM so processed. The incomplete ROLEM enters section D with self-hinging membranes attached to the sidewalls. Glue sealant, if used, is then applied to either the hinged section of the sidewall or the edge borders of the membranes or both. The assembly is pressed and held tightly together by opposed rollers as if progresses down the assembly line.

In the collapsed and rolled-up position, the extreme membranes of a ROLEM must flex somewhat. Either the inner membranes must compress slightly, the outer membranes elongate, or a combination of both actions must take place. The reason for this is that in the rolled-up position, a single wind of the roll has a thickness with one membrane on the inside of the wind and another membrane on the outside of the wind. The membrane on the outside of the wind has a slightly larger circumferential distance than the membrane on the inside of the wind. The amount the inner and outer membranes must flex, can be reduced either by reducing the thickness of the collapsed ROLEM cross section or by increasing the diameter of a ROLEM roll.

In any case, the last step in the manufacture of a ROLEM will involve rolling the combined membranes up into one roll. Because the inner and outer membranes will necessarily have to flex somewhat, a tensioning device must be employed to flex the ROLEM membranes while they roll up. A schematic drawing for such a device is depicted in section E of FIG. 14. The desired effect can be achieved by positioning two opposed holding rollers near the end of the assembly line. These two rollers press against one another with the freshly fabricated ROLEM between them and with enough force to prevent the ROLEM from slipping as it rolls between them. The ROLEM winds on to its roll under enough tension to assure adequate flexure of the membranes. This tension is provided by a torque on the ROLEM roll. The tension which must be applied to the ROLEM will decrease as the roll increases in diameter, and it may be desirable to decrease the torque on the ROLEM accordingly.

FIGS. 3 and 4 depict respectively the flattened and expanded position of a ROLEM with membranes attached to hinged portions of the sidewalls. None of the membranes in this embodiment are required to bend (except in so far as they must bend for the device to roll up). The hinging means of the sidewalls 17,18 and the design of the sidewall creates troughs in the sidewalls between successive membranes in the erect position. If roughly "U" channel structural members (11) are fit over these sidewalls, each of the troughs become separate boxes (FIG. 4). If the ROLEM so configured is to be used as a light or electromagnetic wave transmitting insulating panel, then the membranes would be clear or translucent and a desiccant will be required to assure that water vapor does not fog up the membranes. Holes (13) could be punched in the sidewalls so that the separate boxes in the sidewalls between each of the glazings could be filled with desicant (14) which would adsorb any moisture between the membranes. This of course assumes that the ends of the ROLEM are closed and sealed in some fashion. Glass panes have also been added to the extreme sides in FIG. 4 to protect the more delicate glazings between. Such a ROLEM embodiment would be well suited for use as an architectural glazing panel requiring excellent finish and aesthetics.

While the above description contains many specificities, these should not be construed as limitation on the scope of the invention, but rather as an amplification of one preferred embodiment thereof. Many other variations are possible. For example the ROLEM embodiment in FIGS. 5 and 6 could have had hinged sidewall portions to be used both to help secure the device to structural members and as platforms for the addition of subsequent glazings, panels or membranes. Accordingly, the scope of the invention should be determined not by the embodiments illustrated but by the appended claims and their legal equivalents.

I claim:
1. A device which can be unrolled and erected (or expanded) so as to serve as a transparent or otherwise electromagnetic radiation limiting, sound and heat insulating building panel comprised of:
 (a) roughly flat components which, when assembled, are adequately flexible to be rolled up and which in cross section resemble a flattened parallelogram,
 (b) multiple extruded membranes layered one on top of another whose extreme members constitute, in cross section, two roughly parallel line segments of said parallelogram,
 (c) two sidewalls which, in cross section, constitute the other two roughly parallel segments of said parallelogram,
 (d) a means for a provision to attach securely said sidewalls of the device to a structural frame as in, for example, a flange running the length of a sidewall providing a surface to fasten the sidewalls to a building frame,
 (e) a means of securely attaching intentionally positioned layered membrane edges to one sidewall and the other layered membrane edges to the other sidewall in such a way that when the device is expanded or erected the distance between subsequent roughly parallel membranes and the tension applied to these membranes between the two sidewalls will be predictable, wherein said tension being design-variable by slightly varying the distance between the membranes' attachments to the sidewalls, and thereby varying the extent to which they will stretch when the device is erected or expanded, assuming none are allowed to sag,
 (f) a means of hinging the membranes where they attach to the sidewalls so they hinge at least 90° to the sidewalls so that if the device were unrolled and laid flat, resembling a flattened parallelogram in cross section with the membranes lying one on top of another, then the device could be erected or expanded by turning the sidewalls so they would be roughly perpendicular to the multiple membranes and allowing air into the cavities between the membranes, thereby creating a panel with multiple roughly parallel membranes separated by air spaces and bounded perpendicularly by the sidewalls.

2. The device of claim 1 which employs a means for attaching pliant membrane(s) to the sidewalls wherein edge borders of a typical membrane are attached directly to each of the sidewalls so that in the erect or expanded position of the device, these borders are roughly parallel to the sidewalls, roughly perpendicular to the rest of the membrane(s) and the membrane acts as a hinge at the lines of attachment to the sidewall, bending roughly 90°.

3. The device of claim 2 wherein said edge borders of the pliant membranes are attached and supported to the sidewalls with molding strips which are roughly flat and parallel to the sidewalls and which can effectively clamp and support the membrane borders between these moldings and the sidewalls.

4. The device of claim 3 wherein said molding strips are composed of a material which is rigid relative to said pliant membranes but which can elastically flex somewhat away from the sidewall surface near the edge of attachment of said pliant membrane with the sidewall, so that in the erect or expanded position of the device, these membranes will flex inwardly away from the sidewalls thereby applying a predictable tension on said pliant membrane.

5. The device of claim 1 wherein membranes are attached to hinging means integral to the device's sidewalls, thereby making it unnecessary for the membranes to bend near the edges when the device is expanded or erect and thereby making the use of somewhat rigid membranes possible.

6. The device of claim 1 wherein the membrane(s) attached by hinging means integral to the sidewalls, are relatively rigid and the membrane(s) which are self-hinging and attached directly to the sidewalls are comparatively flexible so that when the device is erected or expanded, the relatively flexible membranes will be slack or stretched and tensioned as required.

7. The device of claim 1 wherein means are provided for the sidewalls to accomodate rigid panels such as glass panes, plywood panels, metal or plastic sheets.

8. The device of claim 1 wherein sidewalls incorporate a means to house a desiccant useful for eliminating unwanted condensation on the membrane surfaces.

9. The device of claim 1 wherein membranes of specific optical and electromagnetic radiation limiting characteristics are used.

10. The device of claim 1 which will absorb much of the acoustical energy in predetermined sound spectrum ranges passing through the panel, by elastically tensioning individual membranes specific amounts so that they will oscillate at predetermined resonant frequencies, thereby absorbing some of the acoustic energy in those frequencies, and combining into one panel (or device) many elastic differently tensioned membranes which together effectively sound insulate over relatively large frequency ranges.

* * * * *